United States Patent [19]
Brosnan

[11] Patent Number: 6,136,063
[45] Date of Patent: Oct. 24, 2000

[54] PROCESS FOR SEPARATING HAZARDOUS METALS FROM WASTE MATERIALS DURING VITRIFICATION

[75] Inventor: Denis A. Brosnan, Clemson, S.C.

[73] Assignees: Clemson University, Clemson; AJT Enterprises, Inc., St. Stephen, both of S.C.

[21] Appl. No.: 09/033,827

[22] Filed: Mar. 3, 1998

[51] Int. Cl.$^7$ ........................................................ C22B 9/02
[52] U.S. Cl. ........................... 75/407; 75/10.36; 75/10.32; 75/10.65; 588/252
[58] Field of Search .................................. 75/10.1, 10.32, 75/407, 10.36, 10.65; 588/252

[56] References Cited

U.S. PATENT DOCUMENTS

| | | |
|---|---|---|
| 3,417,716 | 12/1968 | Iacobovici . |
| 3,812,620 | 5/1974 | Titus et al. ................................... 48/65 |
| 4,317,684 | 3/1982 | Hooykaas . |
| 4,508,040 | 4/1985 | Santén et al. . |
| 4,574,714 | 3/1986 | Bach et al. . |
| 4,615,283 | 10/1986 | Ciliberti et al. . |
| 4,632,690 | 12/1986 | Colwell, Jr. et al. . |
| 5,093,103 | 3/1992 | Jochum et al. . |
| 5,612,008 | 3/1997 | Kirk et al. . |

OTHER PUBLICATIONS

O'Connor, et al.; "Vitrification of Municipal Waste Combuster Residues: Physical and Chemical Properties of Electric Arc Furnace Feed and Products"; pp. 17–37; 1994; Albany, Oregon No Month.

O'Connor, et al.; "Evaluation of the Graphite Electrode Arc Melter for Processing Heterogenous Mixed Waste"; pp. 559–569; Reprinted from the 1996 International Incineration Conference, Savannah, Georgia, May 6–10, 1996.

Oden, et al.; "ASME/U.S. Bureau of Mines Investigative Program on Vitrification of Residue (ASH) from Municipal Waste Combustion Systems"; *CRTD*–vol. 24; 1994; New York, New York No Month.

Oden, et al.; "Evaluation of the Three–Phrase, Electric Arc Melting Furnace for Treatment of Simulated, Thermally Oxidized Radioactive and Mixed Wastes (In Two Pars): 2. Description of Waste Mixtures and Results of Melting Test" RI 9612; United States Department of the Interior, United States Bureau of Mines—Report of Investigations/1996 No Month.

*Primary Examiner*—Melvyn Andrews
*Assistant Examiner*—Tima McGuthry-Banks
*Attorney, Agent, or Firm*—Dority & Manning, P.A.

[57] ABSTRACT

A process and system for separating metals from a waste composition and for producing a reusable glass product is disclosed. The process includes heating waste materials containing at least one glass forming substance to a temperature sufficient to volatilize any volitile metals contained within the waste material. The waste material is also heated to a temperature and for a time sufficient for substantially all of the glass forming substances contained within the material to melt and form a molten glass. In one embodiment, the waste materials are heated in a reducing atmosphere in a direct contact radiant heating device, such as an electric arc furnace.

18 Claims, No Drawings

6,136,063

PROCESS FOR SEPARATING HAZARDOUS METALS FROM WASTE MATERIALS DURING VITRIFICATION

FIELD OF THE INVENTION

The present invention is generally directed to a process for separating metals from waste materials. More particularly, the present invention is directed to separating hazardous metals from waste materials during a vitrification process by encouraging volatilization of the metals. Any organic impurities present within the waste materials are also separated from the glassy product by being destroyed during the vitrification process or by subsequent oxidation.

BACKGROUND OF THE INVENTION

Hazardous wastes, including solid and liquid wastes, by definition contain constituents that are believed to be hazardous either to human health or to the environment. In the United States, these wastes are regulated under the Resource Conservation and Recovery Act (RCRA). In order to dispose of such wastes, the wastes typically have to be treated according to some type of remediation process in order to remove or render harmless some of the hazardous components. In most instances, the wastes are not recycled but, instead, end up in landfills.

Many of the hazardous components that must either be removed or render harmless in a waste stream include most of the heavy metals, which are commonly defined as metals having an atomic weight exceeding about 18. In particular, RCRA has set leaching limits for various regulated metals which include arsenic, cadmium, lead, zinc, chromium, copper, barium, etc.

Some remediation processes have proven to be successful in removing hazardous components particularly from gaseous wastes, and some liquid wastes. A need remains, however, for a remediation process for removing solid contaminants contained in solid wastes and wastes that comprise a mixture of liquids and solids. In the past, remediation processes have included, for instance, soil washing, bioremediation, and incineration. Unfortunately, these processes are somewhat contaminant specific and limited to a certain range of organic or metallic substances. Further, the remediated waste, although perhaps clean enough from a risk-based standpoint, is typically unusable for a business or commercial application. In this regard, the residual waste typically ends up in a landfill, but only if the waste material can meet metals leaching criteria, which can be difficult.

Besides incineration, soil washing and bioremediation, vitrification has also been proposed in the past as a process to remediate hazardous wastes. In general, vitrification refers to a process by which a material is heated above its fusion temperature in order to produce a ceramic or glassy material, such as oxides of silicon, calcium, or aluminum. In the past, vitrification has been used to treat hazardous constituents, such as heavy metals, by encouraging the constituents to become a part of the molecular structure of the vitrified matter. In other words, the hazardous constituents have been encapsulated within the glassy materials in order to attempt to prevent the hazardous constituents from leaching out or otherwise entering the environment. Unfortunately, however, those attempting to practice this process have found it extremely difficult to consistently meet leaching criteria for safe disposable of the materials.

In view of these deficiencies, recent attention has been focused on not encapsulating the hazardous components, but instead separating them from the remainder of the materials. For instance, in U.S. Pat. No. 5,612,008 to Kirk, et al., a process for treating solid wastes containing inorganic contaminants is disclosed. In the process disclosed in Kirk, et al., volatilizable inorganic contaminants are removed from solid wastes by heating the waste to a temperature sufficiently high for volatilization of the inorganic contaminants to occur and sufficiently low so as to prevent vitreous matter or slag formation of the solid waste. In particular, in Kirk, et al., it is important that slag not form due to the large energy requirements and due to the handling problems that may occur. In Kirk, et al., however, not all of the contaminants are vaporized and thus residual amounts of contaminants remain in the resulting material. Thus, the resulting material has limited uses.

In view of the above, a need still remains for a process whereby hazardous contaminants, particularly inorganic compounds such as heavy metals, can be separated and removed from a waste material. A need also exists for such a process in which the remaining material is substantially free of hazardous constituents and thus can be recovered, recycled, and used in any desired application.

SUMMARY OF THE INVENTION

The present invention recognizes and addresses the foregoing disadvantages, and others of prior art constructions and methods.

Accordingly, it is an object of the present invention to provide a process for separating various contaminants from a waste composition.

Another object of the present invention is to provide a process whereby inorganic contaminants, such as regulated metals, are volatilized and separated from a waste composition.

It is another object of the present invention to convert a contaminated waste composition into reusable components.

Still another object of the present invention is to first volatilize regulated metals from a waste composition, to vitrify the waste composition, and to separate the vitrified matter from any remaining residual materials.

These and other objects of the present invention are achieved by providing a process for separating metals from wastes comprising the steps of first providing a waste composition containing metals, particularly volatile metals, and at least one glass forming material. The waste composition is heated in a direct contact radiant heating device to at least the fusion temperature of the glass forming material. The waste composition is heated for a time sufficient for substantially all of the glass forming material to melt and form a molten glass. Further, the temperature used to form the molten glass is also sufficient to vaporize substantially all of the volatile metals contained within the waste composition. Once vaporized, the metals can be easily separated from the remainder of the glass forming composition.

After the vaporized metals have been separated from the composition, the composition will be transformed into a molten glass and, in most applications, the glass will contain a small amount of non-glassy materials, such as unvaporized metals and other inorganic compounds. In one embodiment of the present invention, the process further includes the step of separating the molten glass from the non-glassy materials. For instance, gravimetric separation can be used to separate the molten glass from the non-glassy materials. For example, the molten glass can be poured or "tapped" from the radiant heating device leaving the heavier non-glassy materials behind. Alternatively, the glass materials can be mechanically removed from the non-glassy materials using, for instance, magnetics.

During the process, the waste composition is preferably heated to at least 1,900° F., and particularly from about 2,000° F. to about 3,000° F. During at least a portion of the heating step, a reducing atmosphere can be maintained in the radiant heating device. The reducing atmosphere facilitates vaporization of heavy metals and any other unwanted inorganic compounds. The reducing atmosphere can be established by maintaining low free oxygen levels. For instance, the radiant heating device can be supplied with a gaseous, liquid or solid carbon source or halogen source. For instance, coke, charcoal, or carbon monoxide can be added to the heating device.

In order to separate and collect the vaporized metals, a flue gas being emitted by the glass forming composition can be fed to a baghouse or other filter device. In particular, it has been demonstrated that after the metals are vaporized, the metals form oxides or other inorganic compounds in the flue gas and can thus, be easily separated and recovered from the flue gas using a filtering device. Volatile metals that can be vaporized according to the process of the present invention include, for instance, lead, zinc, cadmium, nickel, iron, arsenic, and chromium.

Of particular advantage, if the waste composition contains any unwanted organic contaminants, the organic contaminants are combusted or destroyed during the process. In particular, the inorganic contaminants can be combusted or decomposed within the radiant heating device or, for volatile organic contaminants, can be decomposed or combusted in a thermal oxidizer that is positioned between the radiant heating device, the filtering device and the downstream emissions system used to trap the metallic components.

The radiant heating device used to heat the waste composition, in one embodiment, can be an arc electric furnace. The arc electric furnace can have carbon electrodes which are either held above the mass to be melted or are submerged within the waste composition during the process. The carbon electrodes will decompose during the process and contribute to maintaining a reducing atmosphere within the heating device.

The process of the present invention is suitable for processing all different types of wastes including soil, sludge, dredge, baghouse dust, fly ash, and the like. In some applications, the waste can be ground into small particles and dried so as to have a moisture content of less than about 10%. By reducing the size of the particles fed to the radiant heating device, the resonance times of the wastes can be reduced.

Other objects, features and aspects of the present invention are discussed in greater detail below.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a process for not only remediating hazardous wastes and contaminants but also to a process that recycles the wastes into usable and viable components. The process includes heating a waste composition in order to first volatilize volatile metals and inorganic compounds contained within the waste composition. Second, the waste composition is heated to a temperature sufficient to cause vitrification of any glass forming materials present within the composition. During heating, any organic contaminants present within the waste composition will also be destroyed or decomposed either within the heating vessel or within the flue gas stream or within the flue gas emissions systems.

Once vaporized, the volatile metals and other inorganic contaminants can be separated from the glass forming materials and recovered. For instance, heavy metals, such as cadmium, lead and zinc, can be recovered from the flue gas being emitted by the waste composition using air pollution control equipment, such as a baghouse or other filtering devices.

During the vitrification process, various chemical reactions take place. For example, sources of calcium oxide and aluminum oxide chemically react with the periphery of particles of silicon dioxide until melting takes place. In the case of such compositions, the initial reaction product is the eutectic composition within the phase field of silicamono-calcium silicate-anorthite in the system "$CaO$—$Al_2O_3$—$SiO_2$." Chemical reactions also take place in the destruction or oxidation of organic species. Further reactions take place with respect to decompositions, oxidations, and crystillizations during the progress of the vitrification process.

Once the heavy metals are vaporized, the waste composition contains molten glass and various residual but viable non-glassy materials, such as metal compounds that do not volatilize. Due to differences in density, the molten glass, in most applications, can be easily separated from the non-glassy materials. For instance, a gravimetric separation procedure can be used in which the molten glass is poured or "tapped" from the heating device leaving behind the non-glassy materials, which are generally heavier than the glass material. Alternatively, the heating device may be equipped with a second tapping mechanism or "tap hole" to remove the non-glassy materials by gravity from the vitrification vessel. The resulting glass material is extremely durable, substantially free from contaminants, and can be used for many different purposes. The metals, inorganic compounds, and organic compounds contained within the waste composition, on the other hand, are removed and can either be recycled, safely disposed of, or destroyed.

The process of the present invention will therefore (1) produce a safe product by virtue of removal of hazardous constituents and/or destruction of organic compounds and (2) reduce the volume of materials which must be placed in solid or hazardous waste repositories, such as landfills. In other words, the contaminated waste recycled by the process of the present invention is permanently changed and reused. Because the waste composition is not placed in a landfill, the waste produces no long term liability in the end product.

During the vitrification process of the present invention, the waste materials are entirely transformed via a series of chemical reactions. Therefore, there is no residual waste, either on a microscopic or macroscopic level, that can be physically separated from the vitrified product.

Other advantages of the process of the present invention include the fact that the process is capable of accommodating a wide range of contaminants. It is believed that the process is applicable to almost all non-radioactive contaminants, including the ability to dispose of PCB's and dioxins. It is believed that the process is ultimately very economical, being less expensive than the costs that are now associated with disposing of wastes at hazardous waste landfill sites. All of these advantages are realized by being able to separate metals, metal salts, and other inorganic contaminants from waste materials.

The process of the present invention as described above can handle a wide range of waste compositions and contaminants. The process can handle solid wastes, liquid waste streams, and solid/liquid waste streams. Such wastes include, for instance, hazardous wastes, incinerator residuals, soil, sludge, dredge, baghouse dust, fly ash, concrete blocks, sediments, besides various other materials.

The waste composition can be fed to the process of the present invention without any pretreatment or, in one embodiment, can be dried and/or ground to a smaller particle size if desired. The waste material is a part of the overall recipe or constituents for forming the vitrified material. It is believed that if the waste composition is reduced in particle size prior to being heated, the resonance time within the heating device can be reduced.

For instance, in one embodiment, the waste composition can be ground or crushed in order to reduce its particle size in an appropriate grinding device. The particular grinding device used will depend upon the composition of the waste materials. Examples of grinding devices that can be used in the process include, a jaw crusher, a gyratory crusher, a roll crusher or a combination of the above devices. For most applications, it has been discovered that the optimum particle size is preferably about 12 mesh, which corresponds to the particles having a diameter of less than about 0.661 inches. Prior to being ground, the waste composition can be first dried if desired.

After being ground, in order to facilitate handling of the waste composition, the waste composition can then be pelletized. The size of the formed pellets can range from small agglomerates to briquettes. In order to facilitate the formation of pellets, binders can be added to the composition. Such binders include, for instance, clay such as bentonite clay, or cement such as portland cement. During grinding, during pelletization, or after pelletization, the waste composition is preferably dried. The presence of excessive amounts of moisture may create problems within the heating device and may increase resonance times. For most applications, the feed stock fed to the heating device should have a moisture content of less than about 10% and particularly from about 5% to about 10%.

As described above, one of the primary objects of the present invention is to produce a substantially contaminant-free glass product through vitrification. In order to ensure that a desired glass product is formed, in one embodiment, various glass forming materials can be added to the feed stock prior to being vitrified. For example, for most applications, preferably a basaltic glass is formed. In this regard, depending upon the original composition of the waste materials, a recipe or mix of glass forming metal oxides, such as pure oxides or mineral containing oxides, can be added to the waste composition prior to being heated. Such additives can include, for instance, lime (calcium oxide), silica, silicon dioxide, iron oxide such as mill scale, calcined dolomite which contains calcium oxide, and aluminum oxide. The above additives can be incorporated into the waste composition before pelletization.

Once the waste composition is appropriately sized and any additives are combined with the composition, the composition is then heated in order to first volatilize volatile metals and various inorganic compounds and then heated to a temperature sufficient to vitrify the glass forming materials. For most applications, the waste composition should be heated to a temperature of at least 1,500° F., particularly from about 1,900° F. to about 4,000° F., and most preferably from about 2,000° F. to about 2,900° F.

During the initial heating stages, various contaminants contained within the waste composition are volatilized including various volatile metals and inorganic compounds. Heavy metals that may volatilize include most of the transition metals such as lead, zinc, arsenic, mercury, chromium, nickel, iron and cadmium. The metals that are volatilized can be present in the waste composition as metallic ions, oxide compounds, salt compounds, or as organic compounds.

During the initial stages of the heating process, preferably reducing conditions are maintained within the heating device. It has been discovered by the present inventor that if reducing conditions are maintained, volatilization of the metallic species is encouraged. Reducing conditions, as used herein, are conditions which cause metal oxides and other metal compounds to reduce to metals. Reducing agents that can be added during the heating process which produce a reducing environment are gases and solids that contain carbon including, for instance, charcoal, coke, carbon monoxide and methane. It is believed that hydrogen gas can also be used as a reducing agent.

Although unknown, it is believed that the metals volatilize during heating as metal vapors. Once present in the flue gas, it is believed the metals then reoxidize or react with other gaseous components to form particulates such as metal oxides. Of particular advantage, once formed into a particulate material, the heavy metals can then be easily filtered from the flue gas and collected.

For instance, the flue gas created during the heating process can be separated from the glass forming composition and fed to a filtering device for removing the metal particulates. A suitable filter device can be, for example, a baghouse. Once collected, the heavy metals can be recycled and reused in numerous applications.

Besides facilitating the separation of volatile metals and other inorganic contaminants from the waste composition, the heating step also separates and removes many organic contaminants that may be present within the waste composition. For instance, during the heating step, most organic compounds will be destroyed or decomposed into substantially harmless gases. In particular, the organics can be completely or partially decomposed within the heating device or can be subsequently destroyed or decomposed in the air pollution control equipment that is placed in communication with the heating device.

For example, in one embodiment, a thermal oxidizer can be placed in communication with the heating device upstream from the above-described filtering device. The thermal oxidizer can be used to combust any organic compounds contained within the flue gas that are emitted by the waste composition. The thermal oxidizer can operate at a temperature, for instance, of from about 800° F. to about 2,300° F. and possibly even higher.

In addition to a thermal oxidizer and a filtering device, the system of the present invention can contain various other devices and equipment for treating and cleaning the flue gas prior to release into the environment. For example, in one embodiment, the flue gas being emitted by the melting glass can be first fed to a thermal oxidizer and then to a spray cooler which contacts the flue gas with a cooling fluid, such as water, for reducing the temperature of the gas. From the spray cooler, the gas can enter a cyclone for removing large particulate material. Next, the flue gas can be directed into a baghouse for removing and recovering heavy metals as described above.

If necessary, an acid-gas scrubber can be placed in communication with the baghouse for removing acidic components from the flue gas. From the scrubber, the gas can then be fed to a condenser and to various filters prior to being released into the environment. Such filters can include, for instance, a carbon filter, a HEPA filter, or a combination of both. After passing through the above described equipment, the flue gas is relatively clean and can be released to the environment without any adverse consequences.

Depending upon the constituents of the waste composition, the weight of the waste composition can decrease by as much as 25% during the heating process. Thus far, for most applications, when processing soils, the waste composition has decreased in weight in an amount from about 10% to about 15% by weight.

Besides volatilizing heavy metals and decomposing organic constituents, during the heating step, the waste composition is also vitrified in order to form a molten glass. In this regard, the waste material should be heated to at least the fusion temperature of any glass forming materials present within the waste composition. The waste composition should also be heated for a time sufficient so that substantially all of the glass forming materials melt and form a molten glass. The waste composition will also be heated for a sufficient period of time to complete volatilization of regulated metals. For most applications, the molten glass will comprise primarily silicon dioxide, calcium dioxide, aluminum oxide, or mixtures of the same.

The heating device used in the process of the present invention must not only be capable of heating the waste composition to the fusion temperature of the glass forming materials contained within the composition but must also be able to maintain the temperature at a high level for an extended period of time in order for substantially all of the glass forming materials to form a molten glass. The present inventor discovered that many heating devices are not suitable for use in the process of the present invention. In this regard, preferably the heating device that is used in the process is a direct contact radiant heating device, which refers to a device having a heat source that directly contacts the waste composition.

For instance, in one preferred embodiment of the present invention, the heating device used in the present invention is a submerged arc radiant heating device, such as an electric arc furnace. An electric arc furnace includes electrodes that are submerged within the waste composition and which radiate heat. Of particular advantage, it has been discovered that an electric arc furnace is capable of heating materials for an extended period of time, which is not possible in many other devices.

In one preferred embodiment of the present invention, an electric arc furnace is used having carbon electrodes which are submerged within the waste composition during the heating step. During the process, the carbon electrodes will be consumed. Of particular advantage, as the electrodes are consumed, a reducing atmosphere is created within the heating device which, as described above, facilitates volatilization of the volatile metals.

At the end of the heating step, the waste composition comprises molten glass and, in most applications, a residual but viable non-glassy material that includes nonvolatilized metals. The non-glassy material will generally have a much greater density than the molten glass. Thus, the molten glass can be gravimetrically separated from the non-glassy materials.

For example, in one embodiment, the molten glass can be poured or tapped from the heating device leaving the residual non-glassy materials behind.

It should be understood, however, that besides being gravimetrically separated, the molten glass and non-glassy materials can also be separated mechanically. For instance, in an alternative embodiment, the materials can be allowed to cool, can then be broken up, and the non-glassy materials can be removed magnetically.

The glass material produced during the process of the present invention is substantially free of contaminants, meets all leaching requirements, and can be used in a wide variety of applications. The glass formed can have a partial crystalline structure if slowly cooled, or it can be amorphous if rapidly cooled such as through quenching. Some uses for the glass material include being used as an aggregate in concrete, as a road construction material, as a soil stabilizer, as mineral wool, as a component in making ceramic construction tiles, or can be incorporated into insulation products.

The vitrified product produced according to the present invention is found to exhibit negligible leaching of regulated metals because the metals have been substantially removed by volatilization. Consequently, the metal separation process of the present invention is far superior to prior art encapsulation processes. Leaching goals cannot be exceeded if the vitrified material does not contain the species of interest in leaching procedures.

The present invention may be better understood with reference to the following example.

EXAMPLE

The following tests were performed in order to demonstrate the advantages and benefits of the process of the present invention. In particular, the following example illustrates that the process is fully capable of separating metal, halogen and organic constituents from variable matrices, resulting in a benign glass product.

During the tests, two samples were collected and tested. The first sample contained a combination of a soil collected from a lead acid battery operations neutralization pit mixed with a soil collected from a location where electroplating was performed. This first sample contained significant concentrations of lead, chromium and other contaminants in a matrix of rock, coke, soil and cement block. The first sample also contained various organics and pesticides. 1.67 tons of soil were collected from the lead acid battery operations neutralization pit, while 3.33 tons of soil and other materials were collected from the electroplating location.

A second sample collected and tested was dredge spoils obtained from the Charleston Harbor located in Charleston, S.C. The dredge spoils contained low levels of chromium, lead and zinc. The spoils also contained moderate concentrations of dioxins. Five (5) tons of the dredge spoils were collected.

Bench Scale Studies

Bench scale evaluations were conducted on candidate residues to ascertain the proper glass formulation. This consisted of separate tests of each material in a 50 kW furnace at 50 lb sample sizes. Four melt tests were conducted using dredge spoils (Sample No. 2) and two involving the complex materials (Sample No. 1). Test results can be summarized as follows:

1 Glass formulation was determined.
2. Energy parameters for scale-up to pilot-scale furnace were determined.
3. Glass granulation was demonstrated.
4. Glass chemistry and leachability were determined.

The results were used to accurately scale up glass additive quantities for use in the full-scale demonstration. There were five additives used in this project: mill scale (iron oxide), bentonite, calcined dolomite, cement and silica.

Additive addition, which was based on the bench scale analysis, was determined as follows in order to produce a desired glass product.

TABLE 1

| Component[1] | Complex Feed Mixtures, % (Sample No. 1) | Dredge Spoils Feed Mixture, % (Sample No. 2) |
|---|---|---|
| dredge spoils | — | 67 |
| lead acid battery site | 45 | — |
| electroplating site | 18 | — |
| bentonite | 3 | 0 |
| calcined dolomite | 26 | 26 |
| mill scale | 3 | 0 |
| pozzolan cement | 5 | 5 |
| silica flour | 0 | 2 |

[1]dry weight

Feed Preparation

Although the process is robust in nature, able to process highly variable feed materials under varying operating conditions, its efficiency is highest when the feed is agglomerated to minimize fines, which thus limits dust entrainment in the offgas.

To affect this feed matrix, the raw materials were fed through a series of solids handling devices. These included a dryer, jaw crusher, gyratory crusher, roll crusher, vibratory screen and pelletizer. Specific process steps included first drying the samples to 2% moisture and then crushing the samples to about 12 mesh using the jaw crusher, the gyratory crusher, and the roll crusher. Water and glass forming additives were added and mixed with the samples. Binders were then added to the samples and the samples were pelletized.

Vitrification Process

In order to heat the samples, a 0.8 MW, three phase AC electric arc furnace was used. The furnace had a 5 ft$^3$ hearth capacity and could sustain feed rates up to 1,800 pounds per hour. The furnace included a water cooled shell and three 4 inch electrodes which were automatically fed to the molten bath to maintain proper power levels.

Data Collection and Analysis

There was a considerable amount of data collected during the demonstration activities. These data included both process and emissions control parameters including:

1. Furnace feeds: full set of metals analysis of complex residues (Sample No. 1) and dredge spoils (sample No. 2).
2. Furnace products: full set of metals analysis of glass, metal and the emission control system dusts.
3. Total particulate/metals emissions using EPA Draft Method 5/29.
4. Dioxin/furans using EPA Method 23.

Process measurements collected during the 30 hour test included:

1. Continuous data acquisition system of over 60 parameters including feedrate, temperatures, pressures, gas flowrates power and energy.
2. Continuous emissions monitoring (CEMS) of $O_2$, $CO_2$CO, $NO_x$, HCl, $SO_2$.
3. Miscellaneous data such as glass tap temperature and cold top depth.

Feed Rate

For this demonstration sustained feed rates ranged up to 1200 lb/hr. Sustained material feed rates were as follows:

Average feedrate: 660 lb/h (total test),

Dredge spoils interval; 546 lb/h, and

Complex feed interval: 951 lb/h.

Power Usage

The average power usage for the entire demonstration was 281 kW. This was made up of the spoils interval at 343 kW and the Complex feed at 607 kW. Energy consumption averaged 0.57 kWh/lb for the feed material for the test period; with the spoils requiring 0.58 kWh/lb feed and the Complex 0.55 kwh/lb feed.

Material Balance

With bath temperatures of 2,850° F. in an oxidizing atmosphere all organic matter was decomposed to the respective elements, and metals were either removed in molten form or captured in the emissions control system. The resulting products from the demonstration can be identified as follows:

1. Glass product: 85% of all feed;
   a. dredge spoils feed interval: 81.3%;
   b. Complex feed interval: 79.2%;
2. Air Pollution Control System Dust: 1.2% of all feed;
3. Offgas: 13.3% of all feed; and
4. Metal product: 0.5% of all feed.

What the above numbers show is the process reduced the volume of the feed material by an average of 13.3%; this volume represents the cleansed offgas. The final waste loading in the glass was 57% for the spoils, and 51% for the Complex. Electrode consumption was 18.8 lb/MWh or 21.6 lb/ton of feed.

Product Glass

Primary to data collection and reduction was analyses of the inherent characteristics of the product glass. After testing, it was determined that the product gas was substantially free from impurities. In fact, arsenic, barium, cadmium, chromium, lead, mercury, selenium and silver concentrations in the product glass were below detectable levels, and thus below TCLP limits. Specifically, the results were as follows:

TABLE 2

TCLP Results for the Product Glasses

| | | Analyate Concentration (mg/l) | | | | | | | |
|---|---|---|---|---|---|---|---|---|---|
| | | Sample No. 2 | | | Sample No. 1 | | | | |
| Analyte | TCLP limits | Run #1 | Run #2 | Run #3 | Run #4 | Run #5 | Run #6 | Run #7 | Run #8 |
| Arsenic | 5.0 | <0.2 | <0.2 | <0.2 | <0.2 | <0.2 | 0.2 | <0.2 | <0.2 |
| Barium | 100.0 | <0.2 | <0.2 | <0.2 | <0.2 | <0.2 | <0.2 | <0.2 | <0.2 |
| Cadmium | 1.0 | <0.1 | <0.1 | <0.1 | <0.1 | <0.1 | <0.1 | <0.1 | <0.1 |

TABLE 2-continued

TCLP Results for the Product Glasses

Analyte Concentration (mg/l)

| Analyte | TCLP limits | Sample No. 2 | | | Sample No. 1 | | | | |
| --- | --- | --- | --- | --- | --- | --- | --- | --- | --- |
| | | Run #1 | Run #2 | Run #3 | Run #4 | Run #5 | Run #6 | Run #7 | Run #8 |
| Chromium | 5.0 | 0.1 | <0.1 | <0.1 | <0.1 | <0.1 | <0.1 | <0.1 | <0.1 |
| Lead | 5.0 | <0.1 | <0.1 | <0.1 | <0.1 | <0.1 | <0.1 | <0.1 | <0.1 |
| Mercury | 0.2 | <0.1 | <0.1 | <0.1 | <0.1 | <0.1 | <0.1 | <0.1 | <0.1 |
| Selenium | 0.5 | <0.2 | <0.2 | 0.2 | <0.2 | <0.2 | <0.2 | <0.2 | <0.2 |
| Silver | 5.0 | <0.1 | <0.1 | <0.1 | <0.1 | <0.1 | <0.1. | <0.1 | <0.1 |

In the above table, the portions that were tested were obtained either directly from the furnace or from the resulting product after it had cooled. In particular, run numbers 1, 2, 4, 5 and 6 were sampled from the furnace, while run numbers 3, 7 and 8 were sampled from the resulting product.

It was observed that the product glass formed two distinct states: primarily amorphous or primarily crystalline. From the above table, the crystalline forms are represented as run number 3 and run number 8. The change in state is due to the rate of cooling of the molten glass. During the demonstration molten glass was collected in ingot molds, each holding approximately 800 lbs of material. Rapid cooling produces the amorphous state; slow cooling, or quenching, produces the crystalline state.

Process Emissions

Air flow from the furnace, plus cooling air flow, produced a total flow at the stack of 1,500 acfm. The emissions control system in this experiment incorporated the following devices: thermal oxidizer, spray cooler, cyclone, baghouse, acid-gas scrubber, condenser, carbon filter and HEPA filter.

Dioxin/Furans

Dioxin/furan emissions were well below the EPA's proposed Maximum Achievable Control Technology (MACT) limit of 0.2 ng/dscm of offgas. Total emissions for both the dredge spoils and complex residues were approximately 1/10 of the proposed limit.

Offgas Species

Total offgas species emissions for CO, $NO_x$, HCl, and SO2 were all well below proposed federal standards for new hazardous waste combustors.

Control Efficiencies. Particulate Oxidizer. Scrubber

Particulate control efficiencies were 99.6% for the dredge spoils feed interval, and 99.9% for the complex residues feed interval, confirming the design of the air pollution control system for particulate control.

Thermal oxidizer control efficiency for CO was 99.97% for the complex feed interval and 99.83% for the dredge spoils feed interval, which explains the extremely low CO emissions at the stack.

Scrubber efficiencies for HCl and $SO_2$ were 86.65% and 82.81%, respectively, with a significant portion of both the HCl and SO2 being removed from the gas stream in the baghouse prior to the scrubber.

Key Metal Constituents

Lead and zinc, which are considered toxic metals, were partitioned in the following manner:

1. Complex feed interval (Sample No. 1)
   a. average Pb emission rate from the furnace was 97% of total Pb in feed
   b. average Zn emission rate from the furnace was 109% of total Zn in feed 2. Pb concentration in product glass
   a. below detection level (10 ppm) in dredge spoil glass (Sample No. 2)
   b. maximum 30 ppm in complex glass (Sample No. 1)
3. Zn concentration in product glass
   a. 60 ppm in dredge spoil glass (Sample No. 2)
   b. 20 ppm in Complex glass (Sample No. 1)

Glass Product

The glass product of the above vitrification method was a crystalline or amorphous basaltic glass, essentially free of constituents of environmental concern. The glass had a hardness approximating labradorite or olivine, with a Mohs hardness of approximately 6.0.

Metals

The process is not a producer of distinct or homogeneous metallic constituents. Rather, metals contained in the feed materials are separated into basically two phases, a molten state and vapor state. The molten state contains those heavy metals (e.g. Zn, Ni) which, through gravitational force settle to the bottom of the bath and are periodically tapped out to cool into ingots. Semi-volatile metals (e.g Hg, Pb) are captured as particulate in the emissions control system.

Neither capture point stratifies or separates the metals distinctly. However, because the metals tapped out of the bath are free of non-metallics they can be sold to the metals industry for further separation and processing. Likewise, depending on the amount of semi-volatiles associated with a particular waste stream, these particulate dusts can be recycled in the process to increase their concentration and thus market value.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A process for separating metals from solid wastes comprising the steps of:

providing a hazardous waste material containing at least one volatile metal and at least one glass forming substance;

heating said waste material in a direct contact radiant heating device to at least the fusion temperature of said at least one glass forming substance, said waste material being heated for a time sufficient for substantially all of said at least one glass forming substance to melt and form a molten glass, said waste material also being heated for a time and to a temperature sufficient to vaporize substantially all of said at least one volatile metal which is separated from said molten glass in a flue gas stream;

filtering said flue gas stream in order to collect said vaporized metal; and cooling said molten glass, said molten glass comprising a glass that is substantially free of said at least one volatile metal.

2. A process as defined in claim 1, wherein said waste material is heated to at least 1,900° F.

3. A process as defined in claim 1, wherein said waste material is heated to a temperature from about 2,000° F. to about 3,000° F.

4. A process as defined in claim 1, wherein, after said portion of said metals has been vaporized, said heated waste material comprises said molten glass and a residual non-glassy material, said process further comprising the step of separating said molten glass from said residual non-glassy material.

5. A process as defined in claim 4, wherein said molten glass is separated from said residual non-glassy material by gravimetric separation.

6. A process as defined in claim 1, further comprising the step of adding at least one glass forming substance to said waste material prior to said heating step, said at least one glass forming substance comprising a metal oxide.

7. A process as defined in claim 1, wherein said waste material is heated in a reducing atmosphere in order to facilitate volatilization of said metal.

8. A process as defined in claim 1, wherein said direct contact radiant heating device comprises an electric arc furnace.

9. A process as defined in claim 1, wherein said at least one volatile metal selected from the group consisting of arsenic, barium, chromium, mercury, selenium, nickel, lead, zinc and cadmium.

10. A process for separating metals from waste comprising the steps of:

providing a hazardous waste composition containing volatile metals and at least one glass forming material, said volatile metals comprising materials selected from the groups consisting of lead, zinc, nickel, arsenic, barium, cadmium, chromium, mercury, and selenium;

heating said waste composition in a reducing atmosphere to a temperature sufficient to cause substantially all of said volatile metals to vaporize, said vaporized metals being contained in a flue gas being emitted by said waste composition;

further heating said waste composition in a direct contact radiant heating device to at least the fusion temperature of said at least one glass forming material, said radiant heating device being configured to heat said hazardous waste composition for a time sufficient for substantially all of said at least one glass forming material to melt and form a molten glass that is substantially free of volatile metals, said waste composition comprising said molten glass and a residual non-glassy material;

separating said molten glass from said residual non-glassy material; and filtering said vaporized metals from said flue gas.

11. A process as defined in claim 10, wherein said waste composition is heated to at least a temperature of 2,000° F. during said process.

12. A process as defined in claim 10, wherein said waste composition is heated to a temperature of from about 2,200° F. to about 2,900° F. during said process.

13. A process as defined in claim 10, wherein said molten glass is gravimetrically separated from said non-glassy material.

14. A process as defined in claim 10, wherein said flue gas is filtered by being fed to a baghouse.

15. A process as defined in claim 10, further comprising the step of reducing said waste composition into smaller particles prior to being heated.

16. A process as defined in claim 15, further comprising the step of drying said waste composition prior to heating said composition, said waste composition containing less than about 10% by weight moisture prior to being heated.

17. A process as defined in claim 10, wherein said radiant heating device comprises an electric arc furnace.

18. A process as defined in claim 17, wherein said electric arc furnace includes carbon electrodes that contact said waste composition during said heating step, said carbon electrodes contributing to said reducing atmosphere for facilitating volatilization of said metals.

* * * * *